May 21, 1935.  L. L. COMOY  2,002,432
AUTOMATIC MACHINE FOR MAKING SERUM PHIALS
Filed Oct. 9, 1933  5 Sheets-Sheet 1
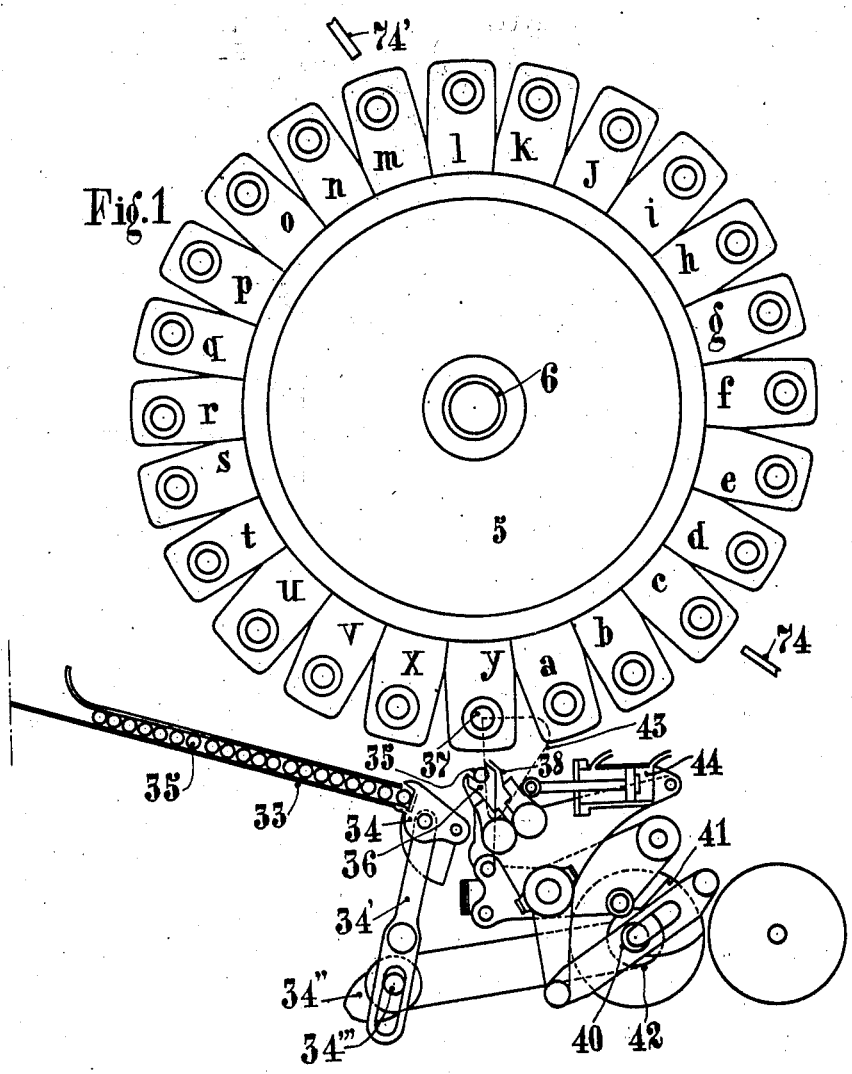
INVENTOR:
Léon L. Comoy
BY
ATTORNEY

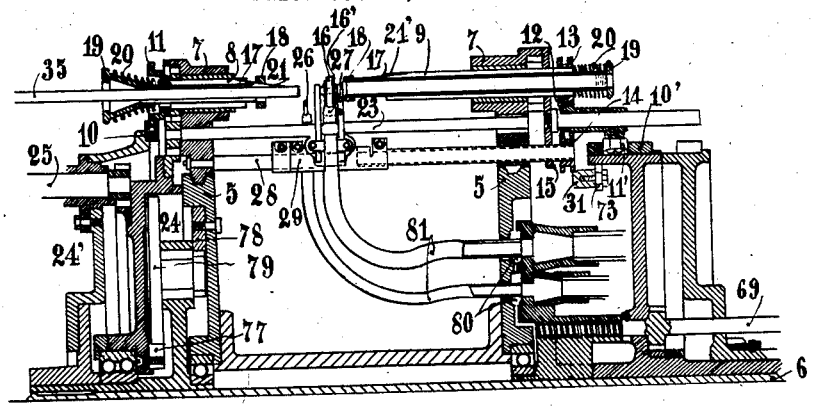
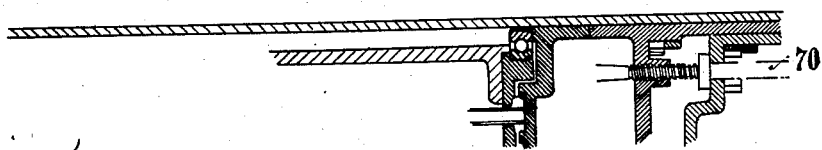
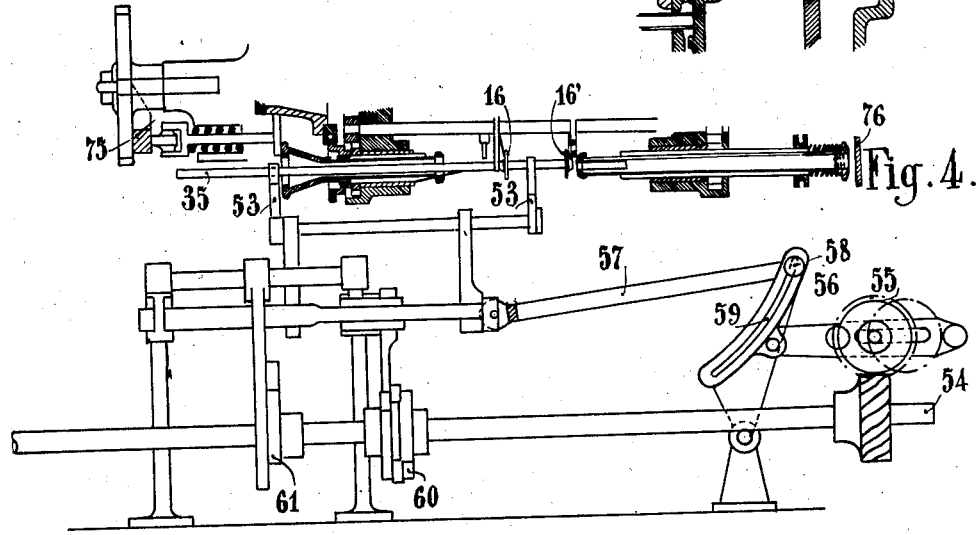
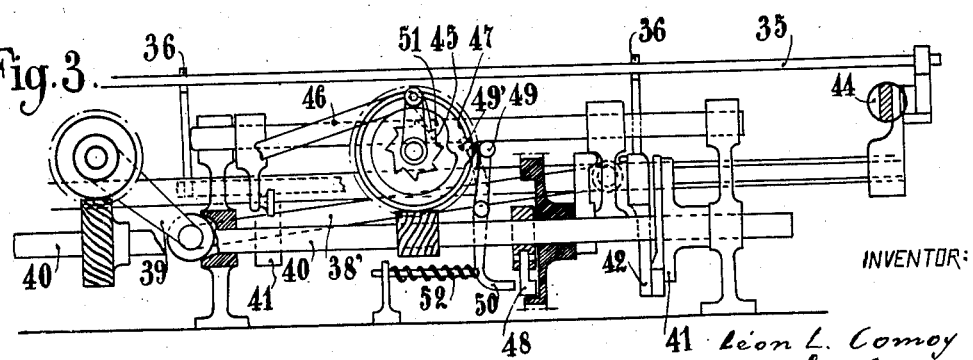

May 21, 1935.   L. L. COMOY   2,002,432
AUTOMATIC MACHINE FOR MAKING SERUM PHIALS
Filed Oct. 9, 1933   5 Sheets-Sheet 3
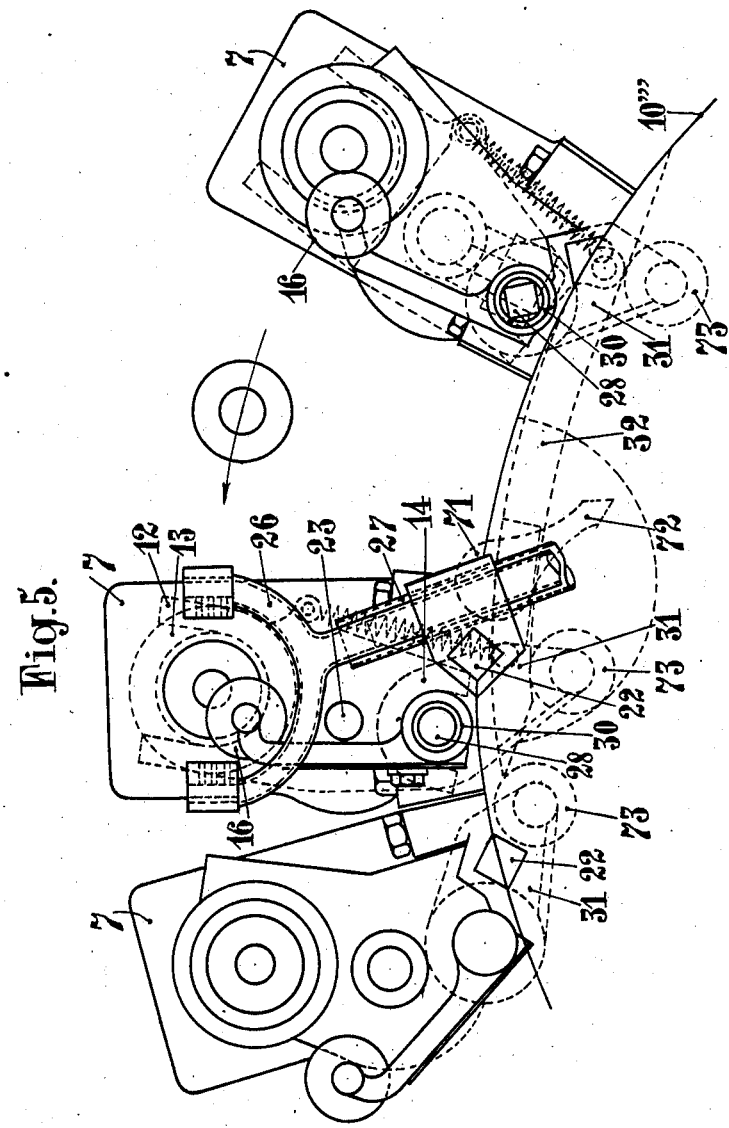
INVENTOR:
Léon L. Comoy
BY
ATTORNEY

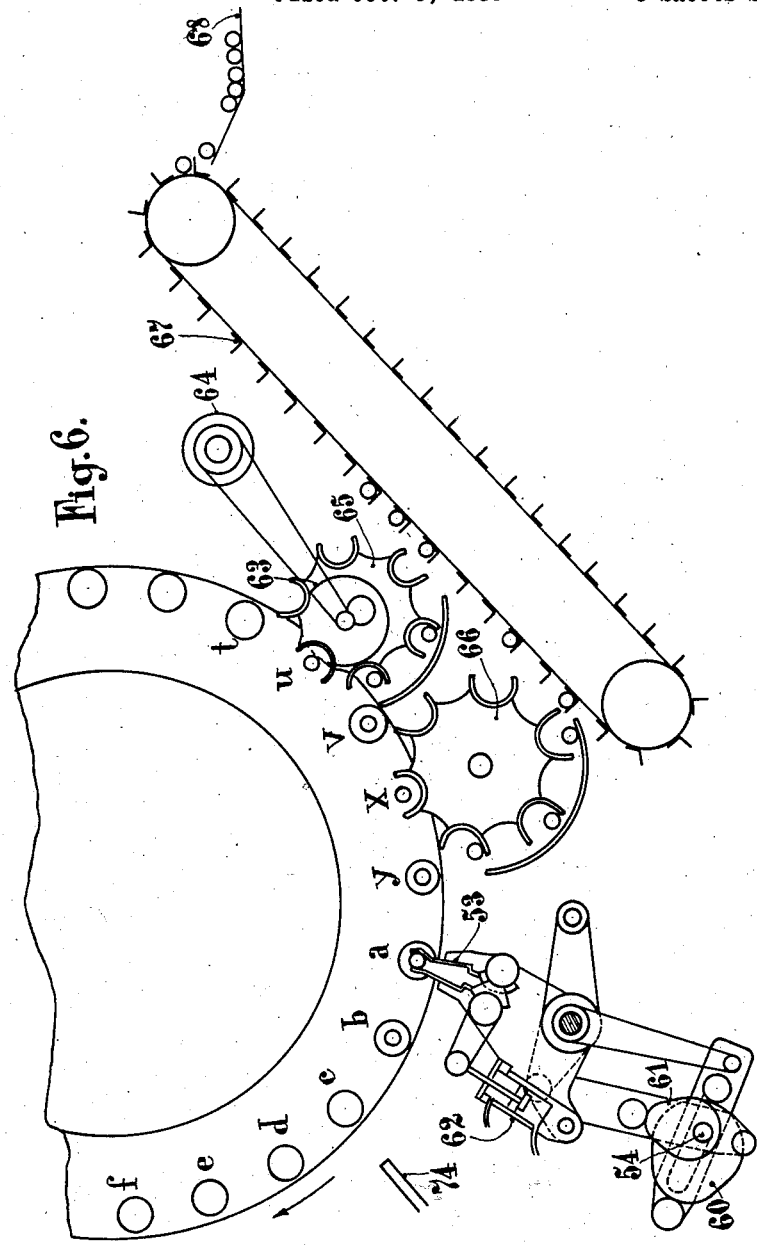

May 21, 1935.　　　L. L. COMOY　　　2,002,432
AUTOMATIC MACHINE FOR MAKING SERUM PHIALS
Filed Oct. 9, 1933　　　5 Sheets-Sheet 5

Patented May 21, 1935

2,002,432

UNITED STATES PATENT OFFICE 2,002,432

AUTOMATIC MACHINE FOR MAKING SERUM PHIALS

Léon Louis Comoy, Paris, France

Application October 9, 1933, Serial No. 692,852
In France October 15, 1932

4 Claims. (Cl. 49—7)

This invention relates to an automatic machine for making serum phials and other glass flasks of small capacity and its chief object is especially to provide a machine having a large output and operating entirely automatically and adapted for making glass flasks of small capacity and more particularly serum phials from glass tubes of indetermined length.

An embodiment of the invention is shown by way of example in the appended drawings, in which Figure 1 is an elevational side view of the whole of the forming blocks of the machine.

Figure 2 is a partial detail sectional view showing one of said forming blocks.

Figure 3 is an elevational sectional view showing the mechanism for introducing the glass tubes into the forming blocks of the machine.

Figure 4 is a sectional view of the mechanism for longitudinally advancing the tubes as two phials are made.

Figure 5 is an enlarged cross sectional view showing a forming block in different positions.

Figure 6 is an elevational view showing the mechanism for laterally shifting the tubes in the blocks and discharging the phials which have been made.

Figure 7:
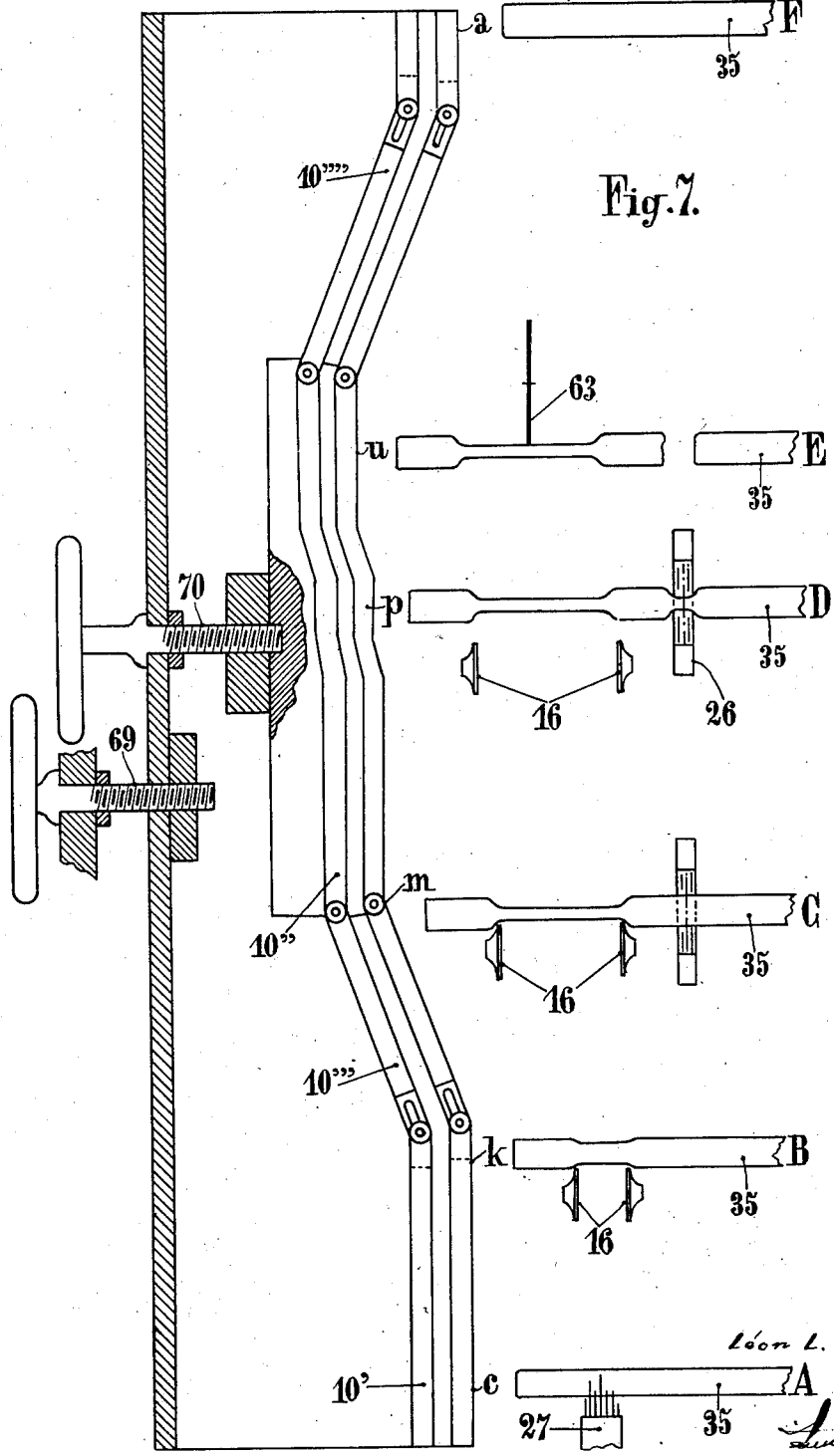
Figure 7 is a diagrammatical view showing the form of the phials in each stage of the making operation and also showing the slopes controlling the longitudinal stretching of the tubes.

The machine according to the invention essentially comprises a number of elements or blocks such as $a, b, c, d \ldots v$ (Figure 1) secured around a plate 5 rotatably mounted on a fixed horizontal shaft 6. Said blocks are formed of two frames 7 each of them carrying a socket. Said sockets are denoted by 8 and 9. The same are synchronously rotated and may be shifted a certain amount along their axis. Said shifting movements are controlled by means of two closed circular slopes 10 and 10' through the medium of the plate 11 for the socket 8 and, for the socket 9, of the roller 11' and of a plate 12 forming a double fork (Figures 2 and 5) embracing two grooved rollers 13 and 14 integral one with the socket 9 and the other with a tube 15 which controls one of the choking rollers 16'. Each socket carries a claw provided with a spring and serving to grasp the glass tube 35. Said claws are denoted at 21, 21'; the opening and closing of the same are effected by means of a tube 17 carrying, on the one hand, a conical ring 18 and, on the other hand, a head 19 on which rests a spring 20 which insures the closure of the claws 21, 21'.

The opening of the claws 21, 21' is effected at the desired moment through compression of the springs 20; the tube 17 opens the claws 21 and 21' and releases the glass tube.

Both frames 7 are braced by a rod 22 (Figure 5) through which they are rigidly connected with another; a shaft 23 serves as an intermediary means for insuring the synchronous rotation of the claws 21, 21', which rotation is controlled by the ring 24 receiving itself its movement from the shaft 25 driving another ring 24' integral with the ring 24.

The rod 22 carries two gas burners, the one 26 for forming the bottom of the phials and the other 27 for forming the necks.

The choking rollers 16, 16' which serve to form the choked part of the necks are mounted on a square shaft 28 which extends through two sockets 29. One of said sockets is secured on the tube 15 which is integral with the roller lever 31. Said lever, when following the cam 32 (Figure 5) controls the approaching movement of the rollers 16, 16' towards the glass tube during the stretching of the neck, as will be explained later on.

Each forming block constitutes a unit which is essentially removable so as to allow of a quick replacing of the same if an element happens to be injured, thus avoiding the necessity of stopping the machine.

The machine also comprises a number of subsidiary elements through which the operation is rendered quite automatic.

Said elements are: a mechanism for the introduction of the glass tubes into the machine in operation. Said mechanism (Figures 1 and 3) comprises a tube magazine formed of two sloping carriers 33 on which the tubes 35 are adapted to roll down, a delivering mechanism formed of a lever 34, a connecting rod 34', a cam 34" controlled by the shaft 34''', and the lever 34 for taking a tube 35 out of the magazine on each of its swinging movements. The glass tube 35 is then taken again by two forks 36 which lift the same to the level of the corresponding socket 37, while a clamp 38 simultaneously grasps the said tube and introduces it into the socket 37.

The clamp 38 receives a longitudinal reciprocating movement from the connecting rod 38' which is driven by the crank 39 receiving its movement from the shaft 40. Said shaft which synchronously drives the above mentioned shaft 34'''' makes, when rotating, a revolution during the time of shifting from a block to another. A set of cams 41 and 42 secured on the same shaft transmits a transverse movement to the clamp 38 which permits the glass tube 35 to follow the rotary movement of the whole blocks during the introduction. The transverse movement of the clamp is shown by the dotted lines 43.

The opening and closing of the clamp are effected by a compressed air piston 44, the air being admitted to both sides of the piston through a slide valve (not shown).

The whole introducing mechanism is set in motion when necessary, i. e. when the tubes worked on in the machine are exhausted. The setting in motion is determined by the following set of elements: a ratchet wheel 45 having a number of teeth equal to the number of operations effected upon a glass tube. Said ratchet wheel is advanced for one tooth through the effect of the crank 46 for each revolution of the whole of the blocks about the axis 6. Said ratchet wheel is connected with a cam 47 the rise of which actuates the clutching latch 48 through the medium of a roller 49 and of a lever 50. On the other hand another cam 51 provided with a hollow space or depression is driven by the shaft 40 and makes a complete revolution in the same time as the whole of the blocks. When the introducing mechanism is set in motion, driven by the cam 47, the roller 49' of the cam 51 rests on the plain part of the cam under the action of the spring 52 and stops the movement only when a complete revolution has been effected and consequently all the blocks of the machine have received their glass tube. The movement begins again when the ratchet wheel 45 has made a complete revolution.

For each opertion the glass tube must be shifted on a length corresponding to an operation.

The mechanism through which said shifting is effected (Figures 4 and 6) comprises a double clamp 53 receiving a continuous reciprocating movement from a shaft 54 which makes a revolution in the time for the rotation from one block to another by means of a cam 55 acting upon a swinging lever 56 and a connecting rod 57. The axis 58 through which the connecting rod 57 is connected with the rocking lever 56 may assume the desired position in the groove in form of an arc of a circle 59 of the rocking lever 56. All the desired shifting lengths are thus obtained, the return taking always place at the same point. The double clamp 53 also receives a transverse movement similar to the movement described for the feeding and effected by the cams 60 and 61. The opening and closing of the clamp are effected by the compressed air piston 62.

The whole of the elements for each block, i. e. the burners and choking rollers as well as the slopes controlling the shifting movement of the movable claws 21' is so designed and arranged as to produce two phials or a double phial in each operation.

The order of the following operations is diagrammatically indicated in Figure 7.

At A the burner for forming the necks heats the glass tube; at B the neck is on the point to be stretched, the choking rollers 16, 16' are moved towards the glass tube; at C the neck is stretched, the rollers have reduced the tube to the desired diameter, allowing to form cylindrical necks; at D the rollers yield back and the burner 26 for forming the bottoms has been inflamed and heats the glass tube; at E the bottoms are formed, then a saw 63 severs the necks; the delivery takes place at F; the glass tube 35 is then shifted along and the cycle of operations begins anew.

The removing elements comprise the saw 63 (Figure 6) which is driven by a prime mover 64. Said saw is rotatable about the axis of the prime mover in order to permit the control of the cut; the whole is also movable transversally. A bucket wheel is provided at 65 for receiving the first phial made at the moment of the cut; a second bucket wheel 66 receives the second phial which is released through the opening of the claws; at this moment a current of compressed air drives the phial into the bucket wheel 66. Both bucket wheels 65 and 66 deliver the phials into the bucket chain 67 which delivers them onto the table 68 where they are inspected before packing.

One of the movable claws 21' is moved longitudinally for stretching the neck, forming the bottoms and return to its primitive position; said movements are controlled by the slope 10' which is provided with a closed groove and drives the roller 11' in both directions. The shifting movements of the movable sockets 9 and of the choking rollers 16' are controlled by the shifting movement of the roller 11' in the closed groove 10' and the whole may be shifted by means of the screw 69. The movable part 10" of the slopes is connected with the part 10' by means of two sloping elements 10''', 10'''' which are hinged together and provided with slideways permitting their displacement by means of the screw 70.

The diameter of the necks at the lower part of the same is determined by the approaching movement of the rollers 16 and 16' with respect to the glass tube 35. Said approaching movement is controlled, as above mentioned, by the cam 32, which is fixed on one of the sloping elements 10''' which are hinged together. Said cam may be removed from the sloping element by means of the excentred axis 71 actuated by the handle 72 forming a marking index. When removed from the slope 10''' the cam 32 causes the rollers 73 to separate further from another so that the choking rollers 16, 16' will form a neck having a smaller diameter.

The operation of the machine is generally as follows.

The magazine 33 being provided with glass tubes the machine is set in motion after having been regulated. The mechanism for the introduction is released at the moment when the rise of the cam 47 shifts the roller 42 and said mechanism introduces as many glass tubes as there are blocks in the machine, i. e. twenty four in the example shown.

The tubes are introduced into the block $y$ (Figure 1); they are advanced longitudinally for the desired length from $a$ to $b$. In the block $c$ the burners for forming the necks are inflamed by means of the small flame 74 which burns continuously; the tube is heated from $c$ to $k$; at $k$ the burners are extinguished and the stretching and reducing of the neck take place from $k$ to $m$; the burner for forming the bottoms is inflamed at $m$ also by the small flame 74', the heating being continued till the formation of the bottoms at $p$. At $q$ the cutting off is effected by means of the saw 63 as well as the delivery of the first phial; the delivery of the second phial takes place at $x$ by means of a current of compressed air coming from the exhaust side of a control slide valve (not shown). Between $x$ and $y$ the glass tube waste is discharged. The opening and closing of the claws 21 at the desired moment are caused by the rotary cam 75. The opening and closing of the claws 21' for the delivery and the taking up of the tubes again is controlled by a rocking lever 76 actuated by the shaft 54. The shaft 6 carries the whole of the blocks through the medium of a plate 5 receiving a rotary movement through the medium of rings 77 and 78 connected together by planetary pinions 79.

The heating burners are supplied with gas in the known manner through the medium of the rotary distributors 80 and hoses 81.

In the above description the making of phials in bottle form with a flat bottom has been explained, but, of course, for obtaining phials or flasks having another form, such as phials with two points, it will be sufficient to replace the slopes 18 and 18' by other slopes having a suitable profile.

What is claimed is:

1. In a machine for fabricating ampoules or similar articles, a device for feeding glass tubes of indefinite length used in their entire length for the making, without loss, of a number of the articles, comprising a magazine for the tubes; mechanism for distributing the tubes singly in a rotary intermittently moving shaping drum provided with receiving sockets; means for axially moving each tube in each operation through the desired length; means for starting the tube-distributing mechanism when the tubes being operated upon are exhausted; means for shaping the articles in the rotary drum; and means for discharging the shaped articles.

2. The combination of a machine for fabricating ampoules or similar articles; a device for feeding glass tubes of indefinite length, comprising a tube magazine having two inclined supports on which the tubes roll; a tube-distributing mechanism comprising a cam, a connecting rod, and a rock lever for conveying each glass tube from the magazine in each of its oscillations; two forked members for raising the tube to the level of its receiving socket; reciprocatory tongs automatically opened and closed for gripping each tube and introducing the same into its corresponding socket; a connecting rod actuating the said tongs with a reciprocatory longitudinal movement; means for imparting to the said tongs reciprocatory longitudinal movement and to give them a transverse movement permitting the tube to follow the rotary movement of the shaping drum; means for axially shifting each tube a desired length on each rotation; means for starting the tube-distributing mechanism when the tubes being fabricated are exhausted; means for shaping the articles in the drum; and means for discharging shaped articles.

3. A machine for fabricating ampoules or other articles from glass tubes of indefinite length, comprising a tube magazine; mechanism for introducing the tubes into a rotary shaping drum having receiving sockets and actuated intermittently; means for shifting each tube axially through a desired length in each operation, comprising double tongs having continuous reciprocatory movement; means for automatically effecting the opening and closing of the tongs; means for imparting a transverse movement to the tongs permitting them to follow the shaping means; means for starting the tube-introducing mechanism when the tubes being fabricated are exhausted; means for shaping the articles in the drum; and means for evacuating shaped articles therefrom.

4. An apparatus for fabricating ampoules or other articles of glass from glass tubes of indefinite length, comprising a tube magazine; means for distributing the tubes singly into a rotary shaping drum provided with receiving sockets and actuating intermittently; means for axially shifting each tube in each operation through the desired length; means for starting the tube-distributing mechanism when the tubes being fabricated are exhausted, comprising a ratchet having a number of teeth equal to the number of operations to which each glass tube is subjected; a connecting rod adapted to rotate the ratchet through one tooth for each rotation of the shaping drum about its axis, said ratchet being combined with a cam for actuating the supporting mechanism, the clutching of which is assured by means of a second cam when all the receiving sockets of the drum have received their tubes; means for shaping the articles in the rotary drum; and means for discharging them from the same.

LÉON LOUIS COMOY.